(12) United States Patent
Yelvington

(10) Patent No.: US 9,132,879 B2
(45) Date of Patent: Sep. 15, 2015

(54) CONVERSION OF TWO WHEELED MOTORCYCLE TO A THREE WHEELED TRIKE CONFIGURATION

(71) Applicant: Yelvington Trikes, LLC, Largo, FL (US)

(72) Inventor: Richard Daniel Yelvington, Largo, FL (US)

(73) Assignee: Yelvington Trikes, LLC, Seminole, FL (US)

( * ) Notice: Subject to any disclaimer, the term of this patent is extended or adjusted under 35 U.S.C. 154(b) by 0 days.

(21) Appl. No.: 14/135,974

(22) Filed: Dec. 20, 2013

(65) Prior Publication Data

US 2014/0191485 A1   Jul. 10, 2014

Related U.S. Application Data

(60) Provisional application No. 61/848,295, filed on Dec. 31, 2012.

(51) Int. Cl.
*B60G 9/02* (2006.01)
*B62K 11/02* (2006.01)
*B62K 11/00* (2006.01)
*B62K 13/04* (2006.01)

(52) U.S. Cl.
CPC ................. *B62K 11/02* (2013.01); *B62K 11/00* (2013.01); *B62K 13/04* (2013.01); *Y10T 29/49622* (2015.01)

(58) Field of Classification Search
CPC .......... B62K 13/04; B62K 11/02; B62K 5/06; B62D 61/12; B60G 9/02

USPC ........................ 180/209, 210, 215, 219, 53.3; 475/204–206, 221; 280/124.11
See application file for complete search history.

(56) References Cited

U.S. PATENT DOCUMENTS

| | | | | |
|---|---|---|---|---|
| 2,376,419 | A * | 5/1945 | Cole | 180/211 |
| 4,561,518 | A * | 12/1985 | Grinde | 180/215 |
| 4,860,850 | A * | 8/1989 | Takahashi | 180/215 |
| 4,876,918 | A * | 10/1989 | Hudson | 74/650 |
| 4,905,787 | A * | 3/1990 | Morin | 180/209 |
| 6,883,629 | B2 * | 4/2005 | Hanagan | 180/211 |
| 7,228,930 | B1 * | 6/2007 | Vey | 180/210 |
| 7,581,610 | B2 * | 9/2009 | Ward | 180/209 |
| 7,610,979 | B1 * | 11/2009 | Dykowski et al. | 180/210 |
| 7,762,368 | B2 * | 7/2010 | Matthies | 180/210 |
| 7,984,782 | B2 * | 7/2011 | Platt et al. | 180/217 |
| 2002/0063011 | A1 * | 5/2002 | Montague | 180/350 |
| 2006/0172846 | A1 * | 8/2006 | Gassmann et al. | 475/221 |
| 2008/0135320 | A1 * | 6/2008 | Matthies | 180/210 |
| 2010/0013180 | A1 * | 1/2010 | Allman et al. | 280/62 |
| 2012/0193161 | A1 * | 8/2012 | Chang et al. | 180/215 |

* cited by examiner

*Primary Examiner* — James English
(74) *Attorney, Agent, or Firm* — Laurence P. Colton; Smith Risley Tempel Santos LLC

(57) ABSTRACT

A kit and method of motorcycle to trike conversion using a mono-coupe style overlay plate on both sides of the rear swing arm and a non-straddle differential design incorporating hollow metal tube axles and high thrust load maximum surface area bearings, the having a differential assembly comprising a non-straddle differential, a frame, and an axle assembly comprising an axle, wherein the non-straddle differential is supported by the axle.

14 Claims, 18 Drawing Sheets

CONVERSION OF TWO WHEELED MOTORCYCLE TO A THREE WHEELED TRIKE CONFIGURATION

STATEMENT OF RELATED APPLICATIONS

This patent application is based on and claims the benefit of U.S. Provisional Patent Application No. 61/848,295 having a filing date of 31 Dec. 2012.

BACKGROUND OF THE INVENTION

1. Technical Field

The present invention generally is in the field of conversion kits for converting two wheeled motorized vehicles to three-wheeled motorized vehicles, and more specifically is in the field of conversion kits having a non-straddle, axle-supported differential and/or a braking assembly at least partially attached to a differential housing.

2. Prior Art

Like bicycles, motorcycles rely on the ability of the rider to maintain balance of the vehicle when moving or at a rest.

A three wheel trike "delta configuration" (i.e. one front wheel and two rear wheels) gives an ordinary motorcycle the inherent ability to remain upright when moving and at rest. This is possible due to the stance created from changing the dimensional stability of the motorcycle from vertical to horizontal with the replacement of the one rear wheel with two rear wheels that are spread far enough apart to create a stable platform.

Many efforts have been made to achieve this dimensional stability by the use of add on, outboard wheels. This creates a four wheel vehicle (one in front and three rear wheels) that retains the original rear wheel to provide the drive power. This is similar to the training wheels used on a child's first bicycle. This configuration gives riding and at rest stability but carries an often dangerous risk when cornering. With the outboard wheel configuration the outer tire will lift during most turns. When this happens the outboard tires and center drive wheel are usually rotating at different speeds because of their different diameters or distance from the center line of the vehicle. As the turn is completed the outer wheel comes back into contact with the road surface. That outer tire must now "spin up" its rotations to match the other tires. This spinning up causes a drag on that side of the vehicle with a corresponding braking action thus lurching the vehicle towards that side.

To eliminate this, most trike designs have gone to the delta configuration where the two rear wheels are on a solid axle or more commonly two axles joined by a differential unit.

Most of these designs require extensive modification to the swing arm and even the motorcycle frame itself because of the weight of the rear assembly with its tires, fenders and sometimes a fiberglass or metal full body. Many of these conversions use shortened versions of regular automobile rear ends. Their extensive use of all steel automotive components results in excessive weight behind the normal center of gravity of the vehicle. Additionally, these conversions tend to require special skills, special equipment and often take weeks of shop time to accomplish.

Based upon these design compromises, it becomes apparent that what is needed is a rigid, light weight design that would give greater maneuverability, better mileage and be readily adaptable to a variety of motorcycle makes and models. It is to these needs and others that the present invention is directed.

BRIEF SUMMARY OF THE INVENTION

Briefly, the present invention is an improved method of motorcycle to trike conversion using a mono-coupe style overlay plate on both sides of the rear swing arm and a non-straddle differential design incorporating hollow metal tube axles and high thrust load maximum surface area bearings. The present invention provides for the replacement of the rear wheel assembly of a motorcycle, including the drive assembly and brake assembly, with components for converting the motorcycle into a trike, or motor-tricycle.

The preferred non-straddle differential design of the present invention allows the differential to be easily moved to any left and right position on the invention by changing the length of the axles and spacers to allow the differential to work on a modular basis for different trike rear designs. The non-straddle design allows the invention to use the axles as support for the differential.

The differential is designed to run on the ends of the axles and acts as its own support. The differential uses two bearings per side. One bearing acts to carry the spyder gear and the axle support and the other bearing acts just to support the differential off the axle. The differential is modular and can be used to match any chain or pulley drive with a simple adaptor on one end.

The preferred swing arms generally replace the swing arms of the original motorcycle without additional reconstruction of the motorcycle frame. The swing arms are designed to incorporate the differential assembly and brake assembly between the swing arms in the same or similar space as the original motorcycle swing arms, thereby generally maintaining the original size structure of the original motorcycle, but now with a rear end tricycle set-up.

These features, and other features and advantages of the present invention will become more apparent to those of ordinary skill in the relevant art when the following detailed description of the preferred embodiments is read in conjunction with the appended drawings in which like reference numerals represent like components throughout the several views

DETAILED DESCRIPTION OF THE INVENTION

Figure 1:
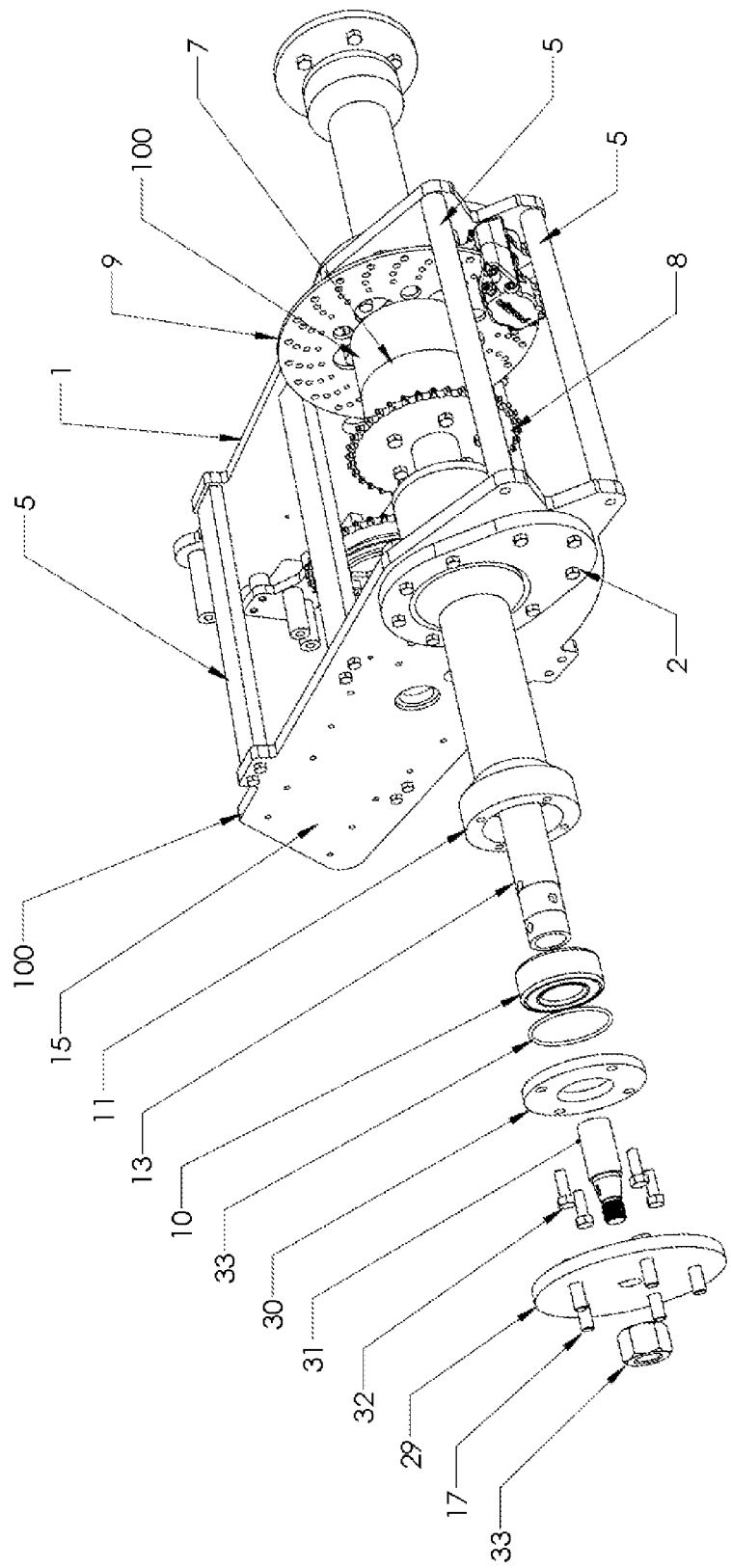
FIG. 1 is a rear perspective view of a first embodiment of the present invention suitable for use with a drive chain.

The design offers significant improvement over existing trike "add on" designs. The invention consists of a non-straddle differential enclosed in a bolt on boxed structure that uses a mono-coupe style form of braced plates. These are bolted on top or to the side of the swing arm on the rear swing arm of the donor motorcycle. This allows for non-professional installation because it does not require frame modifications to the bike as is necessary on other previous examples of the art.

The key component of this system is the clamping method of using a flat plate or round clamps against the swing arm with a corresponding drilled plate on the bottom or side of the swing arm. This allows a nearly universal differential design to be used on multiple configurations. All that is necessary to use the plate on different motorcycles is to change the bolt pattern to match up with the swing arm in question.

Prior art defines the differential as either a straddle design with bearing races protruding from each end which ride on the bearing set into the axle housing ends or a set of pillow blocks bolted to a hard plate or the frame. Either one makes for a longer, heavier and more expensive design than the present invention.

The invention overcomes these problems by using hollow steel or aluminum tubing for axles which is roughly twice the surface area of current prior art designs. All other designs use solid axles of 0.75" to 1" diameters. This limits the bearing size and loading capacity of the axles and bearings as well as increases rolling friction.

By using hollow tubing larger than 1" diameter, weight is saved and depending upon where the splined output is welded, the wheel base of the trike can be configured to exactly match the calculated profile for optimum handling without resorting to extensive additional machining and difficult to produce solid axle lengths. This is an improvement over all other existing designs.

This offers a significant improvement over prior art as it allows for a differential to be built that can eliminate the need for outer bearing races. The differential can now run directly on the axles themselves using them for precise alignment and load support. The bearings are now able to be put at the extreme end of the differential case which puts the engine output load across the tubing support bearing and the outer differential bearing. These loads are possible only because of the large surface area and use of thrust load bearings and hollow tubing.

By using this configuration, the differential can be 3 to 4 inches shorter than present trike differentials. This allows the entire assembly to be placed between the opening left when the stock rear tire of the motorcycle is removed. Present models usually have to replace the entire swing arm with a new assembly made wide enough to accommodate the longer standard straddle differential assembly.

The shorter axle loaded differential of the improved design also allow for a brake disk to be built into the design and to fit in the space left from removing the rear tire. This can be accomplished by either mounting the brake disk on the end of the differential itself, or if space is limited, a metal ring can be welded to the differential and the brake disk is then bolted to the metal ring. This eliminates the need for individual brakes on each wheel, thus saving on weight and costs.

Referring now to FIG. 1, this is a rear perspective view of a first embodiment of the present invention suitable for use with a drive chain. Two side plates 4 are connected by stiffening rods or cross bars 5 and by front mounted inner supports 6. These form a high strength box or frame 110 that holds the differential halves 7 containing the differential assembly 100. A sprocket or pulley 8 and disc brake 9 are machined to accept the end of the bearing 10 on each end of the differential halves 7. This mostly eliminates the need for adaptors and the bearings 10 act as a centering guide for the sprocket 8 and disc brake 9 to ensure that they are in alignment.

Figure 2:
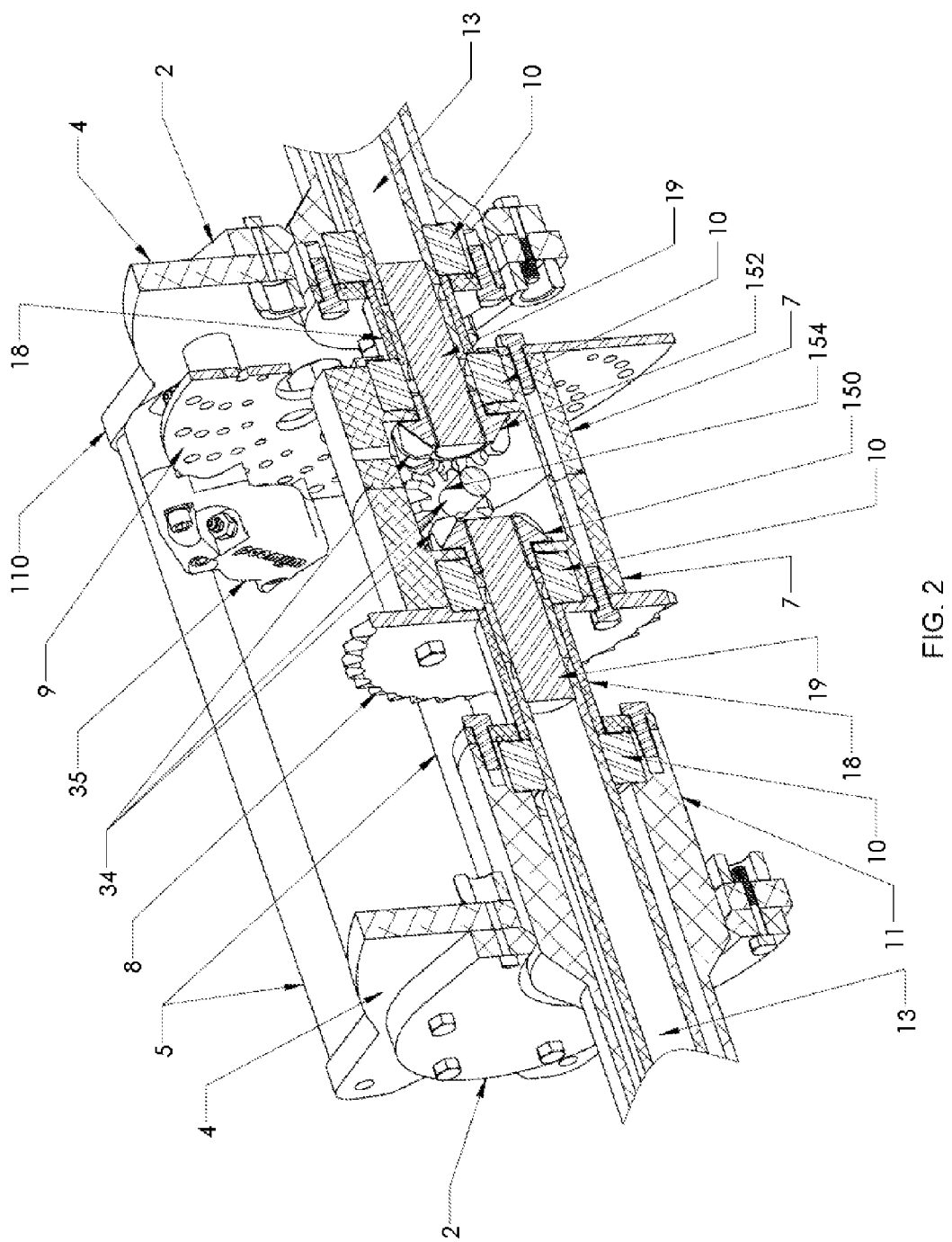
FIG. 2 is a rear sectional view of the embodiment of FIG. 1 showing a non-straddle differential and hollow axles of the present invention.

Referring now to FIG. 2, this is a rear sectional view of the embodiment of FIG. 1 showing a non-straddle differential assembly 100 and hollow axles of the present invention. FIG. 2 provides additional detail showing the axles 13 mating into the differential assembly 100 and engaging the spyder gears 34. In this example first embodiment, the differential assembly 100 is driven by a sprocket 8 and braked by a disc brake 9 with a fixed caliper 35. This allows the trike to brake both wheels with only one disc brake 9. The differential assembly 100 rotates on the ends of the axles 13 and friction is controlled by the use of an inner bearing 10. This allows the differential assembly 100 to be easily moved to any left and right position by changing the length of the axles 13 and spacers 18 to allow the differential assembly 100 to work on a modular basis for different trike rear designs.

Referring now to FIGS. 1 and 2, two axle support tubes 11 are bolted to the left and right side of the side plates 4 and extend outwardly from the box or frame 110 formed by side plates 4 and cross bars 5. Axle supports tubes 11 act as rigid extensions of the box or frame 110 to carry the weight of the trike assembly and passenger. Large surface area bearings 10 are at each end of the axle support tubes 11 and support the hollow axle tubing 13. Wheel hubs 29 are drilled for wheel studs 17 to hold the wheels and tires to the trike assembly. Spacing is achieved between components by the use of hollow spacers 18. These allow for the wheel base to be adjusted left or right for centering axle stubs 19 into the differential assembly 100, namely differential halves 7, and differential gears 34. The bearing 10 is held in place by the end cap 30 and the wheel hub assembly is held in place by the tapered shaft 31, mounting block 32, and lock axle nut 33.

Figure 3:
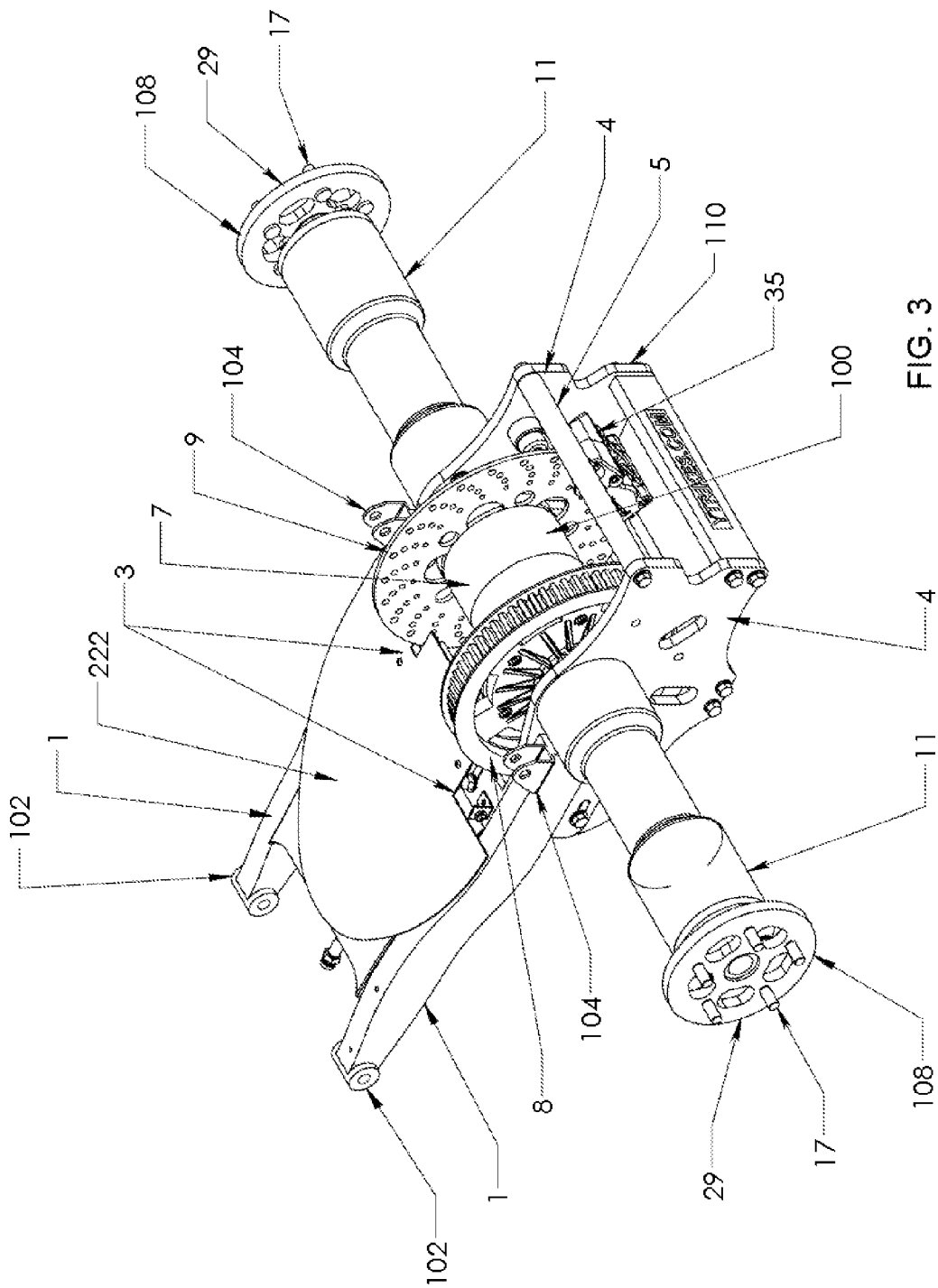
FIG. 3 is a rear perspective view of a second embodiment of the present invention suitable for use with a drive belt.

Referring now to FIG. 3, this is a rear perspective view of a second embodiment of the present invention suitable for use with a drive belt. The second embodiment has generally the same design, structure and operation as the first embodiment, except for using a sprocket that cooperates with a drive belt, rather than a drive chain. In FIG. 3, the swing arms 1 are shown along with an overlay plate 2, both of which are installed on the side plates 4. Such overlay plate 2 can be drilled with adjusting holes to allow for drive chain or drive belt (not shown) adjustment. Swing arms 1 are attached to the motorcycle/tricycle frame (not shown) via bearings or attachment points 102. Shock absorbers (not shown) are attached to the swing arms 1 via anchors 104. Thus, the inventive device is attached to and suspended on an original motorcycle frame in a conventional manner using the attachment points 102 and anchors 104 on swing arms 1.

Also in the second embodiment shown in FIG. 3, two side plates 4 are connected by stiffening rods or cross bars 5 and by front mounted inner supports 6. These form a high strength box or frame 110 that holds the differential halves 7 containing the differential assembly 100. A sprocket or pulley 8 and disc brake 9 are machined to accept the end of the bearing 10 on each end of the differential halves 7. Two axle support tubes 11 are bolted to the left and right side of the side plates 4 and extend outwardly from the box or frame 110 formed by side plates 4 and cross bars 5. Axle supports tubes 11 act as rigid extensions of the box or frame 110 to carry the weight of the trike assembly and passenger. Large surface area bearings 10 are at each end of the axle support tubes 11 and support the hollow axle tubing 13. Wheel hubs 29 are drilled for wheel studs 17 to hold the wheels and tires to the trike assembly. Spacing is achieved between components by the use of hollow spacers 18, which allow for the wheel base to be adjusted left or right for centering axle stubs 19 into the differential assembly 100, namely differential halves 7, and differential gears 34.

As can be seen, the differential assembly 100, the drive assembly comprising sprocket 8, and the brake assembly comprising disc brake 9 and caliper 35, are contained with the box or frame 110 between side plates 4. This allows the inventive device to operate within the same general footprint as the drive assembly and brake assembly of the original motorcycle.

Figure 4:
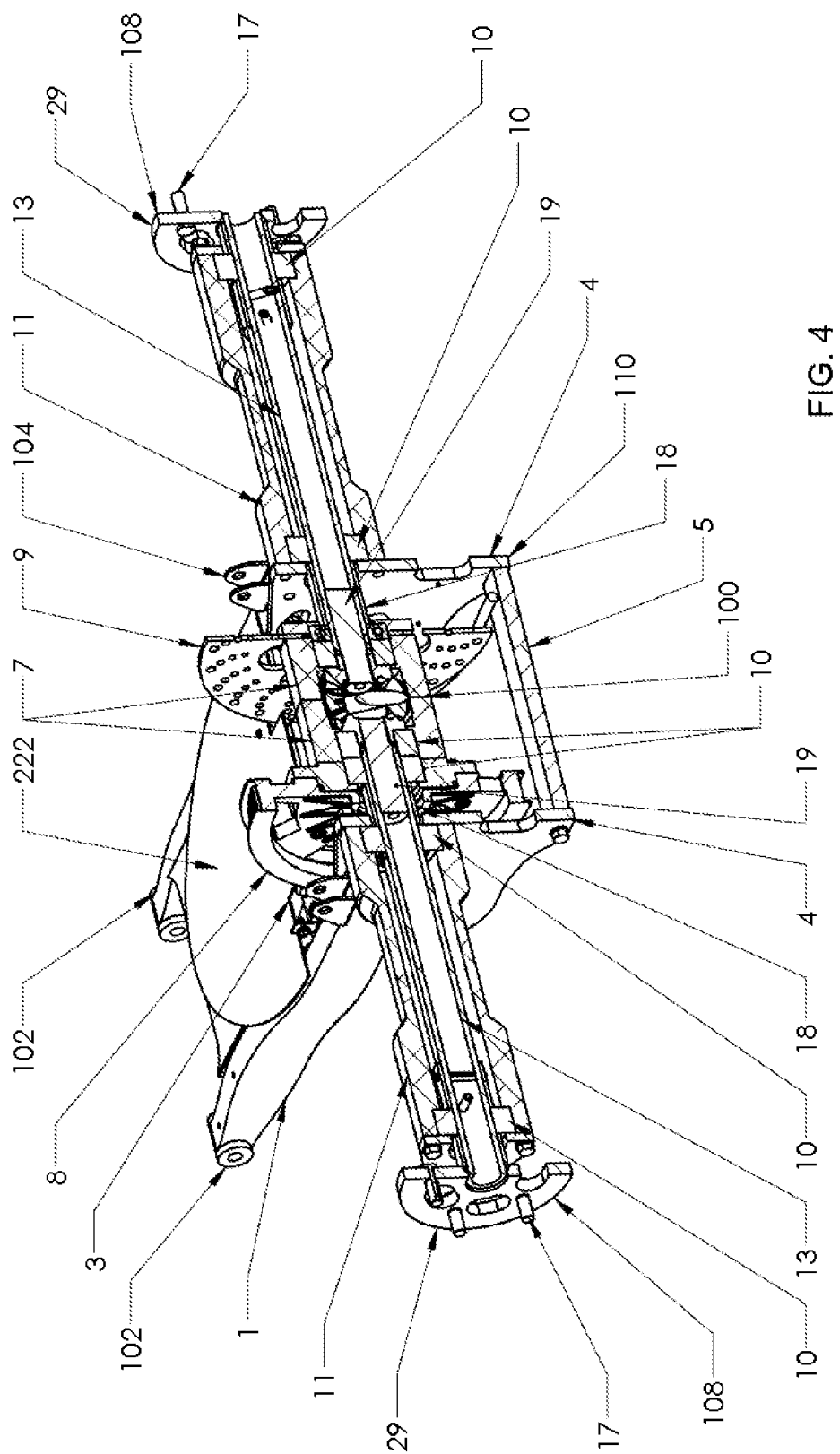
FIG. 4 is a rear sectional view of the embodiment of FIG. 3 showing a non-straddle differential and hollow axles of the present invention.

Referring now to FIG. 4, this is a rear sectional view of the embodiment of FIG. 3 showing a non-straddle differential and hollow axles of the present invention. FIG. 4 also provides additional detail showing the axles 13 mating into the differential assembly 100 and engaging the spyder gears 34. In this example second embodiment, the differential assembly 100 also is driven by a sprocket 8 and braked by a disc brake 9 with a fixed caliper 35. This allows the trike to brake both wheels with only one disc brake 9. The differential assembly 100 rotates on the ends of the axles 13 and friction is controlled by the use of an inner bearing 10. The axle 13 or the axle stub 19 is replaceable with a component selected from the group consisting of a longer axle 13, a shorter axle 13, a longer axle stub 19, an a shorter axle stub 19, whereby the differential assembly 100 can be located at different locations between the at least two side plates 4 based on the selected component. This allows the differential assembly 100 to be easily moved to any left and right position by changing the length of the axles 13 and spacers 18 to allow the differential assembly 100 to work on a modular basis for different trike rear designs.

Axles 13 can be seen supported within axle support tubes 11 via bearings 10, one bearing preferably located proximal to teach end of each axle 13. With support tubes 11 secured to side plates 4, axles 13 extent through access holes 106 in side plates and are connected on one end to differential spyder gears 34 via axle stubs 19. Wheel hub assemblies 108 are attached to another end of axles 13. In this manner, as differential assembly 100, specifically differential spyder gears 34, are turned by the engine via the drive chain or belt and the sprocket 8, the axle stubs 19, being connected to the spyder gears 34, are turned, thus turning the axles 13 and the wheel hubs 29, thus turning the wheels. Bearings 10 allow for the axles 13 to turn within the axle support tubes 11 with reduced friction. In this manner, the differential spyder gears 34 are turned directly by the rotation of the sprocket 8.

Figure 5:
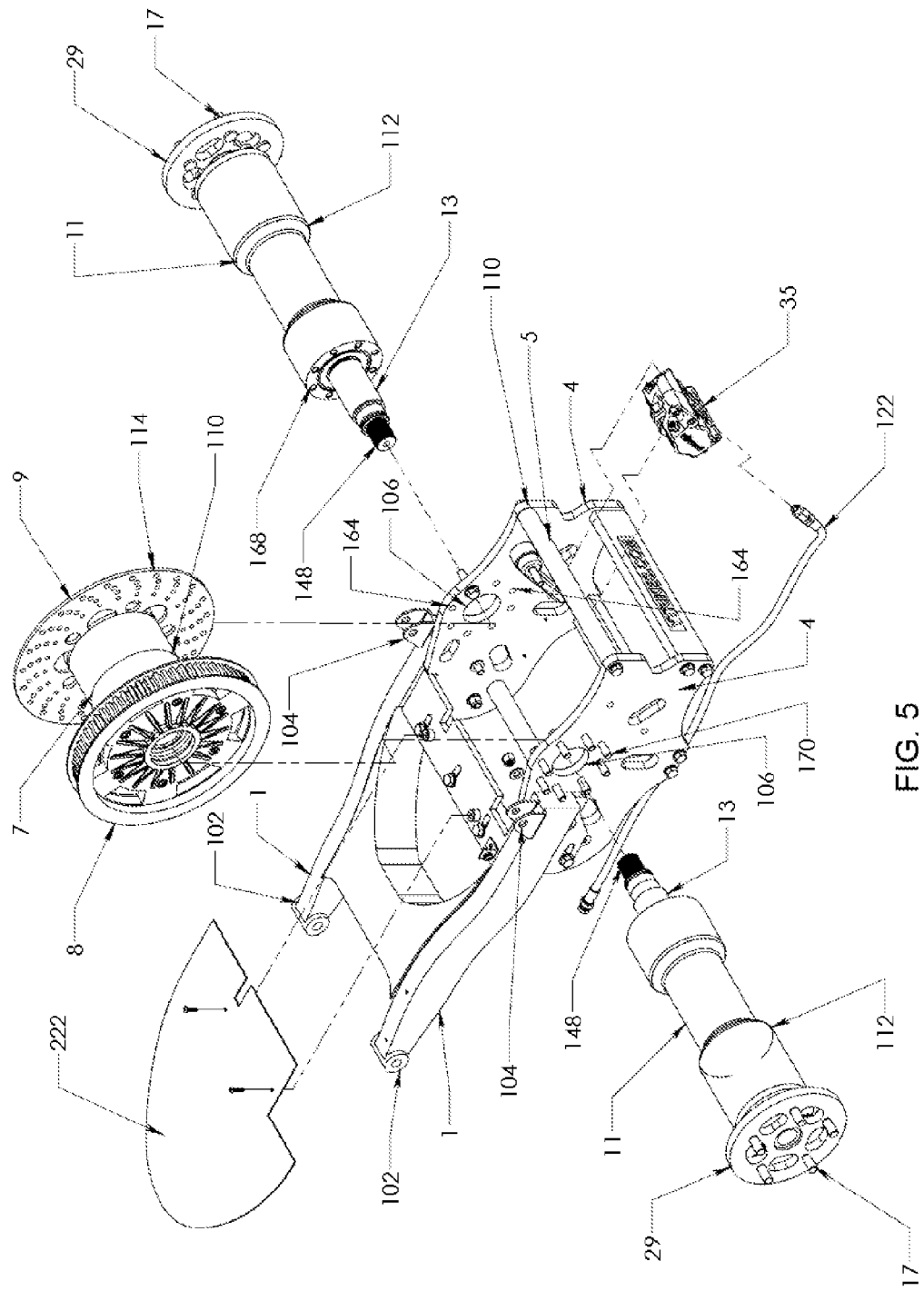
FIG. 5 is an exploded view of the embodiment of FIG. 3.

Referring now to FIG. 5, this is an exploded view of the embodiment of FIG. 3, showing the drive assembly 114, the two axle structures 112, the disc brake 9, and the safety plate 2 removed from the support framework, namely, box or frame 110, of the present invention. This view illustrates in more detail two concepts of the present invention. The first concept is that the differential assembly 100 is supported on the axles 13 rather than the differential assembly 100 and axles 13 being supported by a differential housing. The second concept is that the disc brake 9 is attached to the differential assembly 100, and specifically to a differential half 7, such that the rear braking of the trike is achieved by braking the rotation of the differential assembly 100 and therefor the axles 13, and not by braking of the wheels.

In this view, it can be seen that side plates and cross bars 5 form box or frame 110 and that swing arms 1 are secured to the box or frame 110. Safety plate 2 is placed over the swing arms 1 generally to prevent material from the road from spraying up against the bottom of the trike body, but also for other protective and safety reasons. Drive assembly 114 comprises differential assembly 100, sprocket 8 and disc brake 9 is located within the interior of box or frame 110 generally between access holes 106. Drive assembly 114, nor any part of drive assembly 114, is attached to the box or frame 110.

Each of the axle assemblies 112 comprises an axle 13, an axle stub 19, an axle support tube 11, bearings 10, a wheel hub 29, etc. Axle assemblies 112 are attached to the box or frame 110 by inserting an end portion of the axle 13 and/or the axle stub 19 through access holes 106 such that the end portion of the axle 13 and/or the axle stub 19 extend into the interior of the box or frame 110. Bolts 170 can be inserted through bolt holes 164 in side plate 4 from the interior side and threaded into receiving holes 166 on axle support tubes 11 to secure axle support tubes 11 onto side plates 4.

One of the bearings 10 is located between axle 13 and axle support tube 11 proximal to the access hole 106, preventing axle 13 and/or axle stub 19 from contacting the access hole 106. When a first axle assembly 112 is attached to box or frame 110, one axle stub 19 extends through sprocket hole 116 into differential assembly 100 and is secured to a first one of the spyder gears 34, namely a first sun gear 150. Also, when a second axle assembly 112 is attached to box or frame 110, one axle stub 19 extends through disc brake hole 118 into differential assembly 100 and is secured to a second one of the spyder gears 34, namely a second sun gear 152. In this manner, drive assembly 114 is secured to axles 13 and is supported by axles 13.

As drive assembly 114 is secured only to axles 13, axles 13 can be structured to locate drive assembly 114 anywhere within box or frame 110 between side plates 4. Axles 13 can be made different lengths to locate drive assembly closer to one side plate 4 or the other side plate 4 such that sprocket 8 can be located at a position relative to where drive chain or drive belt is located, which may be dependent on the engine, engine set up, or frame structure of the original motorcycle. For example, a first axle 13 located proximal to the sprocket 8 can be shorter than a second axle 13 located proximal to the disc brake 9 such that drive assembly 114 is located closer to a first side plate 4 opposite the sprocket 9. For another example, a first axle 13 located proximal to the sprocket 8 can be longer than a second axle 13 located proximal to the disc brake 9 such that drive assembly 114 is located closer to a second side plate 4 opposite the disc brake 9. For example, a first axle 13 located proximal to the sprocket 8 can be the same length as, or approximately the same length as, a second axle 13 located proximal to the disc brake 9 such that drive assembly 114 is located approximately centrally within the interior of box or frame 110 between a first side plate 4 opposite the sprocket 8 and a second side plate opposite the disc brake 9.

The disc brake 9 is attached to the differential assembly 100, whereby actuation of the brake 9, 35 acts on the differential assembly 100 to slow the differential assembly 100, and thus slow the axles 13 and wheels. Brake caliper 35 is secured to box or frame 110 at an appropriate position such that brake caliper 35 will interact properly with disc brake 9 so as to brake the drive assembly 100. Hydraulic lines 122 can provide hydraulic fluid to brake caliper 35 for operation in a known manner.

Figure 6:
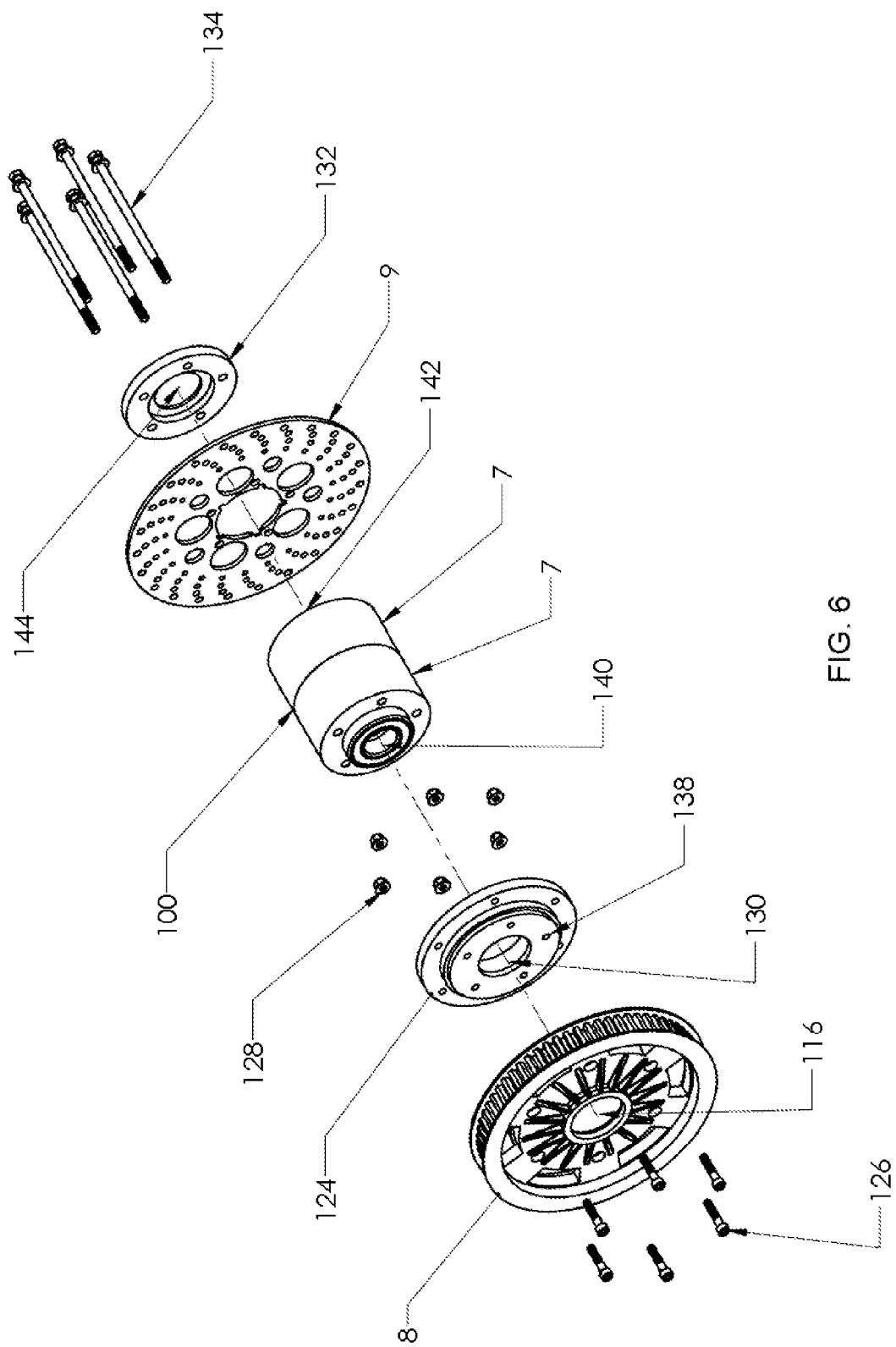
FIG. 6 is an exploded view of the drive assembly of the embodiment of FIG. 3.

Referring now to FIG. 6, this is an exploded view of the drive assembly 114 of the embodiment of FIG. 3. Sprocket 8 is attached to mounting plate 124, for example by bolts 126 and nuts 128. Mounting plate 124 has an access hole 130 that aligns with access hole 106 to allow passage of axle 13 and/or axle stub 19 therethrough and also through access hole 140 in a first differential half 7 into differential assembly 100. Disc brake 9 is attached to a second differential half 7 using pressure plate 132, which secures disc brake 9 to the second differential half 7, such that disc brake 9 is sandwiched between pressure plate 132 and the second differential half 7. Bolts 134 extend through pressure plate 132 and disc brake 9 into and through holes or tunnels 136 through differential halves 7, and bolts 134 are secured into cooperating threaded holes 138 in mounting plate 124. Disc brake 9 has an access hole 118 and pressure plate 132 has an access hole 144 that align with access hole 142 in a second differential half 7 to allow passage of axle 13 and/or axle stub 19 therethrough into differential assembly 100. By tightening bolts 134 into mounting plate 124, sprocket 9, mounting plate 124, disc brake 9, and pressure plate 132 are all secured together and to differential assembly 100, and secure differential halves 7 together to form drive assembly 114.

Figure 7:
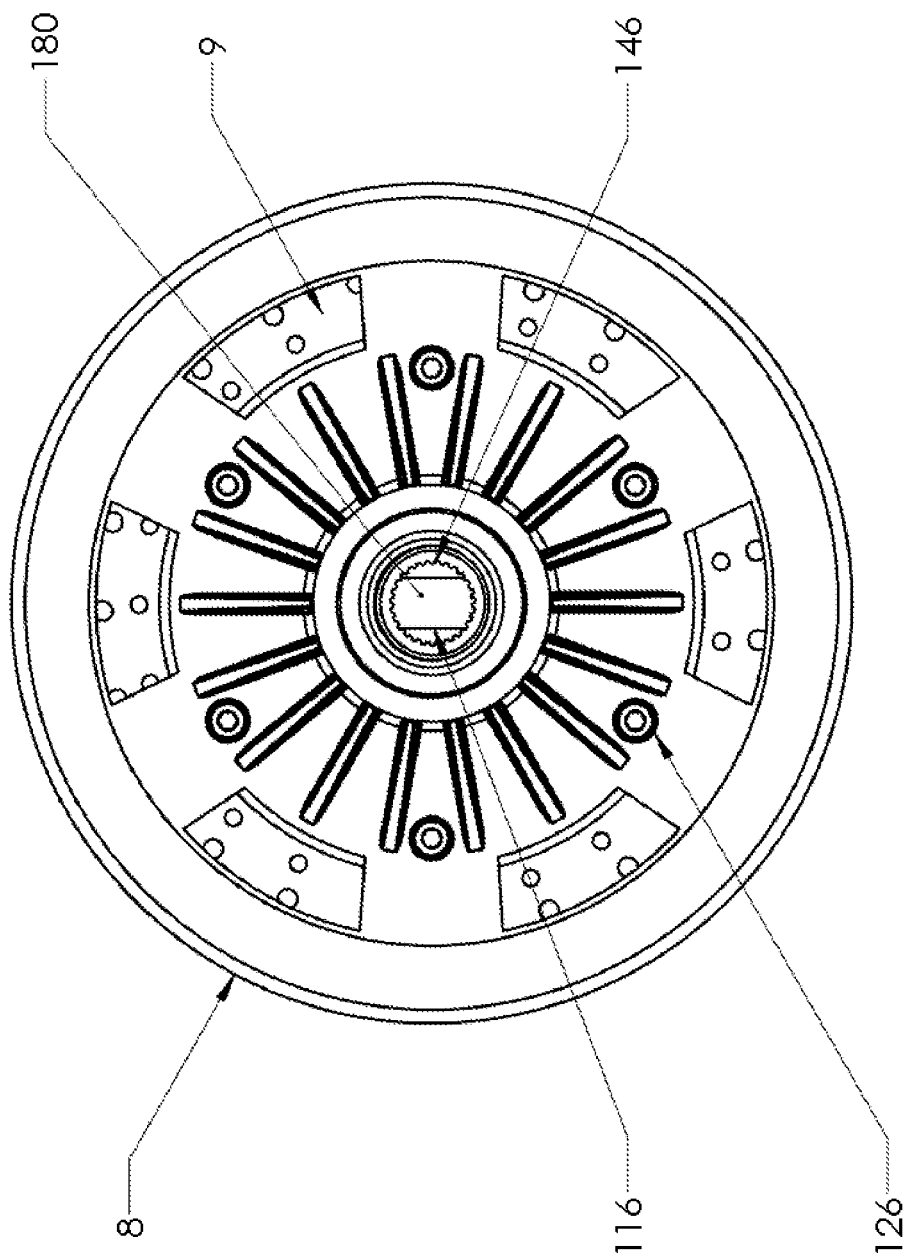
FIG. 7 is an end view of a drive assembly of the embodiment of FIG. 3 showing a drive sprocket suitable for use in the present invention as attached to the differential assembly and disc brake of the present invention.

Referring now to FIG. 7, this is an end view of the drive assembly 114 of the embodiment of FIG. 3 showing a drive sprocket 8 suitable for use in the present invention as attached to the differential assembly 100 and disc brake 9 of the present invention. The interior teeth 146 of a spyder gear 34 can be seen, these interior teeth 146 cooperating with exterior teeth 148 of an axle stub 19 such that the rotation of the spyder gear 34 will turn axle stub 19.

Figure 8:
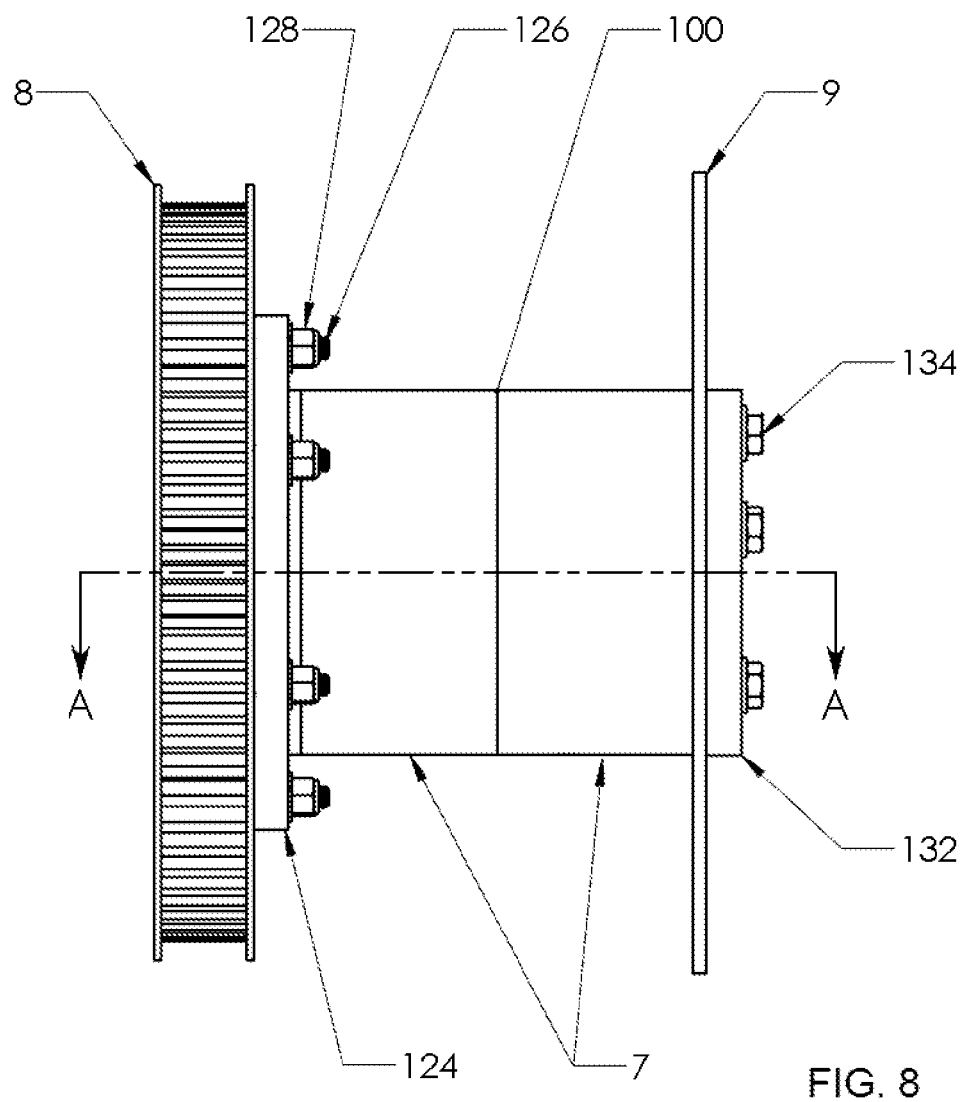
FIG. 8 is a rear view of the drive assembly of the embodiment of FIG. 3 showing a drive sprocket suitable for use in the present invention as attached to the differential assembly and disc brake of the present invention.

Referring now to FIG. 8, this is a rear view of the drive assembly 114 of the embodiment of FIG. 3 showing a drive sprocket 8 suitable for use in the present invention as attached to the differential assembly 100 and disc brake 9 of the present invention. This view illustrates the assembled drive assembly 114. Although in the illustrative embodiments, the sprocket 8 is shown on a first side of the differential assembly 100, attached to a first differential half 7, and the disc brake 9 is shown on a second side of the differential assembly 100, attached to a second differential half 7, the sprocket 8 and the disc brake can be reversed or attached to the same side of the differential assembly 100. For example, the sprocket 8 can be attached to a second side of the differential assembly 100, that is, to a second differential half 7, and the disc brake 9 can be attached to a first side of the differential assembly 100, that is, to a first differential half 7. For another example, both the sprocket 8 and the disc brake 9 can be attached to a first side of the differential assembly 100, that is to a first differential half 7, or both the sprocket 8 and the disc brake 9 can be attached to a second side of the differential assembly 100, that is, to a second differential half 7. The mounting plate 124 and the pressure plate 132 can be used, deleted, or structured to accommodate such a set-up.

Figure 9:
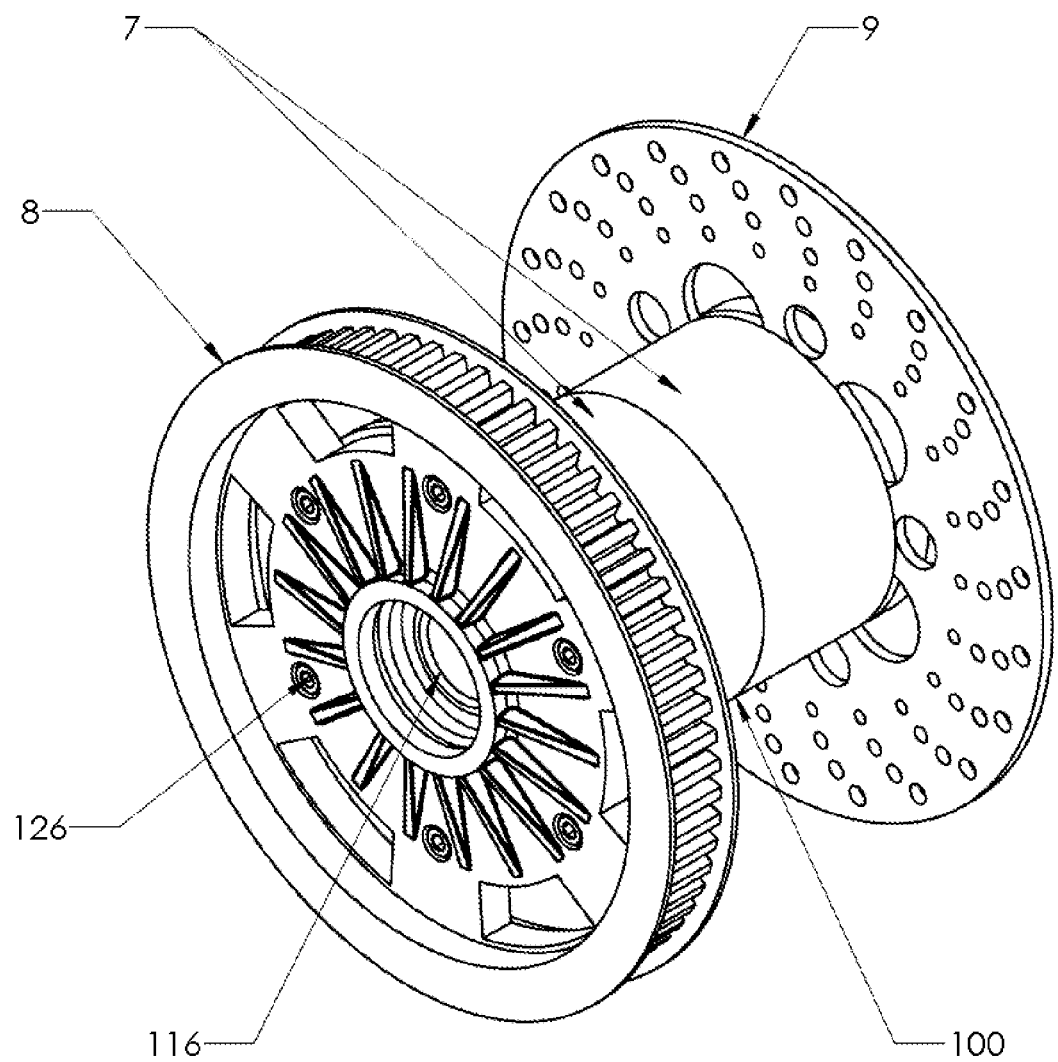
FIG. 9 is a perspective view of the embodiments of FIGS. 7 and 8.

Referring now to FIG. 9, this is a perspective view of the embodiments of FIGS. 7 and 8 showing a drive sprocket 8 and disc brake 9 suitable for use in the present invention as attached to the differential assembly 100 of the present invention. This view also illustrates the assembled drive assembly 114.

Figure 10:
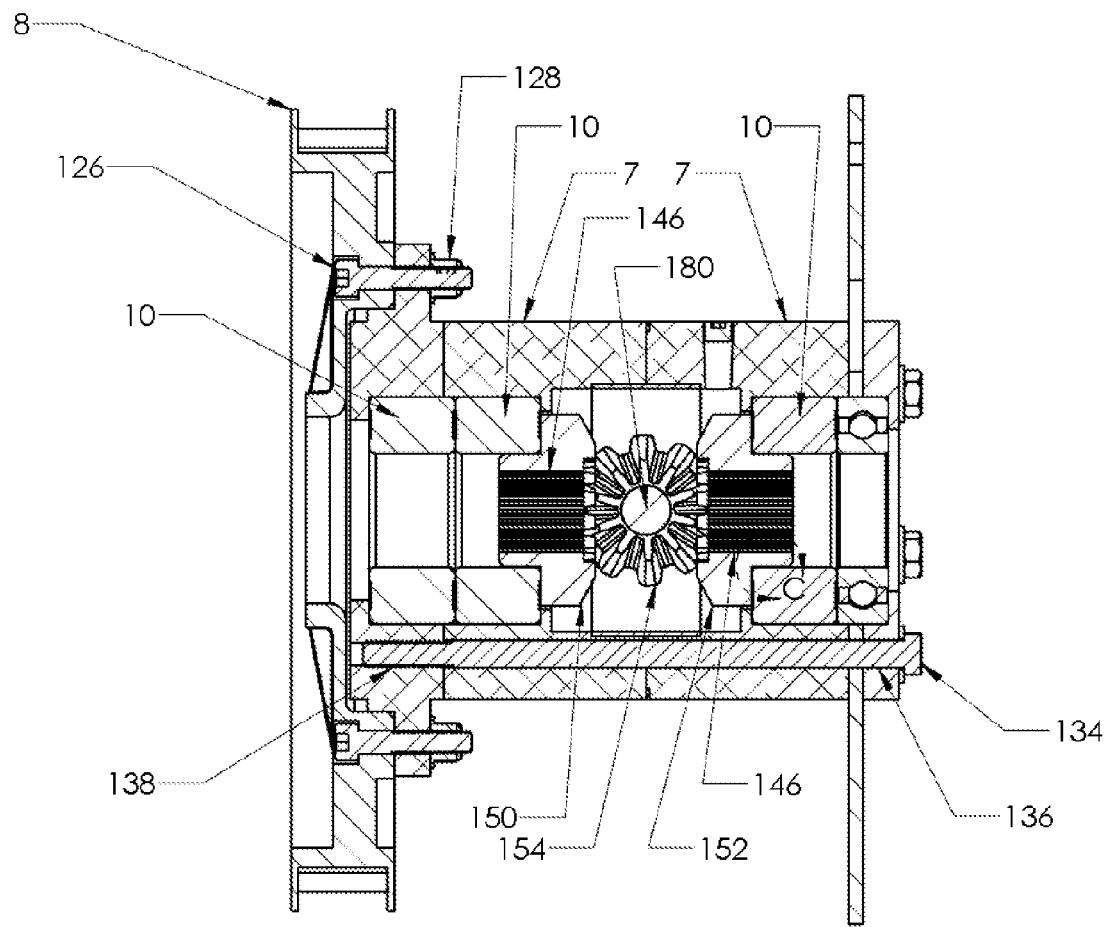
FIG. 10 is a sectional view along line A-A of FIG. 7

Referring now to FIG. 10, this is a sectional view along line A-A of FIG. 7 showing the interior of the differential assembly 100. As can be seen, differential comprises first sun gear 150, second sun gear 152 and first planetary gear 154 structured and oriented in a generally conventional manner. This view also shows in more detail how sprocket 8, disc brake 9, and differential halves 7 form the drive assembly 114 as a single unit. In this view, the relative spacing of bearing 10 to sun gear 152 is shown such that sun gear 152 can rotate within differential housing 100 in a low friction manner. That is, this bearing 10 is a low-friction bearing that allows the rotation of planetary gear 152.

Figure 11:
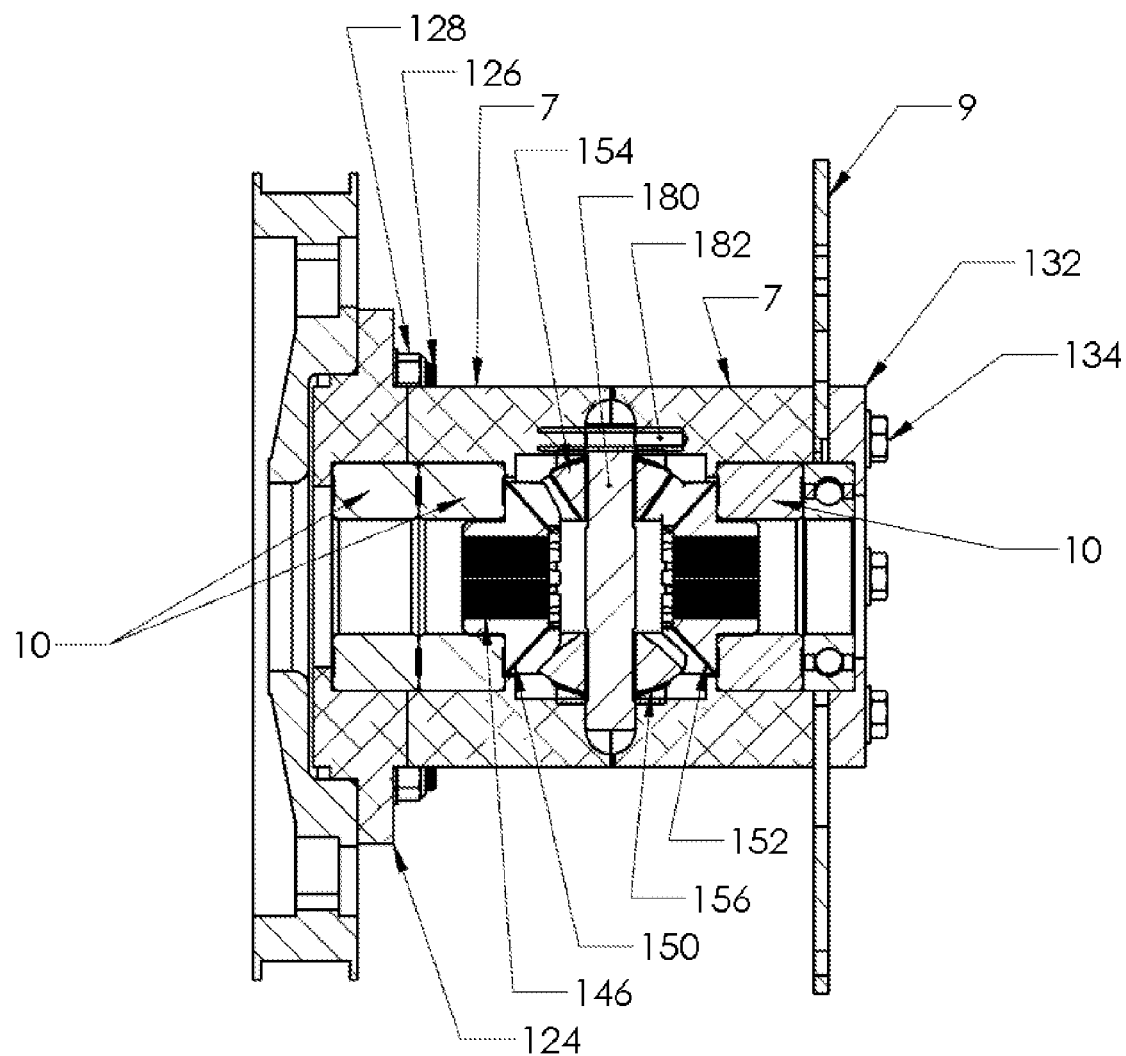
FIG. 11 is a sectional view along line B-B of FIG. 8.

Referring now to FIG. 11, this is a sectional view along line B-B of FIG. 8 also showing the interior of the differential assembly 100. As can be seen in this view as well, differential comprises first sun gear 150, second sun gear 152, and first planetary gear 154, and also a second planetary gear 156, structured and oriented in a generally conventional manner. This view also shows in more detail how sprocket 8, disc brake 9, and differential halves 7 form the drive assembly 114 as a single unit. Shaft 180 supports planetary gears 154, 156 within the differential assembly 100 such that planetary gears can rotate about shaft 180. Shaft is secured within the differential assembly 100 via pin 182 such that when differential assembly 100 spins, shaft 180 also spins, thereby causing planetary gears 154, 156 to spin along with differential assembly 100, thus turning sun gears 150, 152 and powering axles 13 and wheels to move the trike. As the trike turns, the rear wheel on the inside of the turn will need to rotate more slowly than the rear wheel on the outside of the turn, and planetary gears 154, 156 can rotate about shaft 180 in a more or less conventional manner for the operation of a differential.

Figure 12:
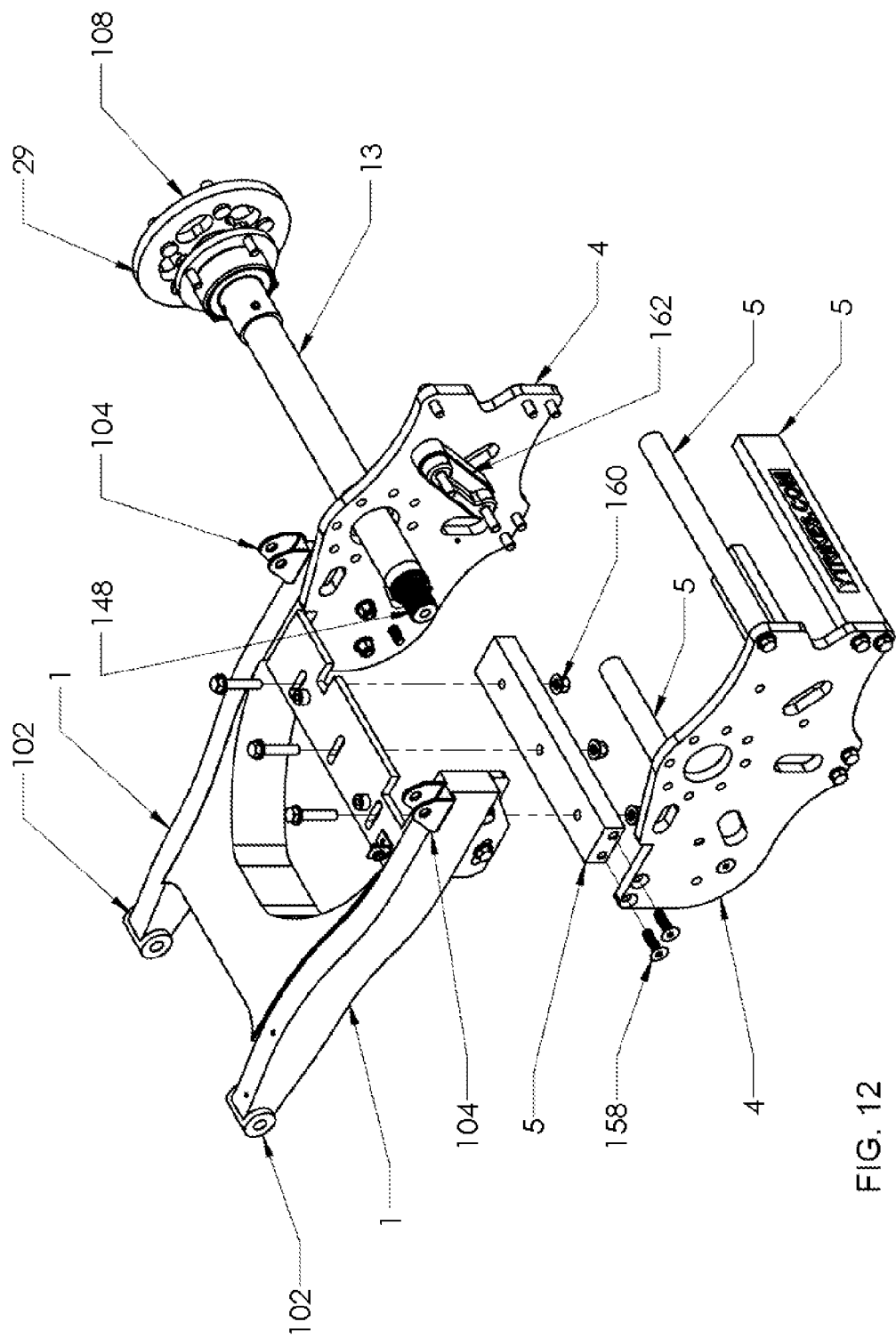
FIG. 12 is an exploded schematic view of the support framework of the embodiment of FIG. 3.

Referring now to FIG. 12, this is an exploded schematic view of the support framework of the embodiment of FIG. 3, namely, of the box or frame 110. This view illustrates a manner in which side plates 4 and cross bars 5 can be assemble together using bolts 158 and nuts 160. Other manners of assembly can be used, such as welding; however, bolts 158 and nuts 160 are preferred for ease of assembling and disassembling the inventive device. This view also shows in greater detail how axle 13 and axle stub 19 extend through access hole 106 into the interior of box or frame 110. Axle support tube 11 is not shown. Caliper brake mounting bracket 162 can be included and onto which caliper brake 35 can be secured.

Figure 13:
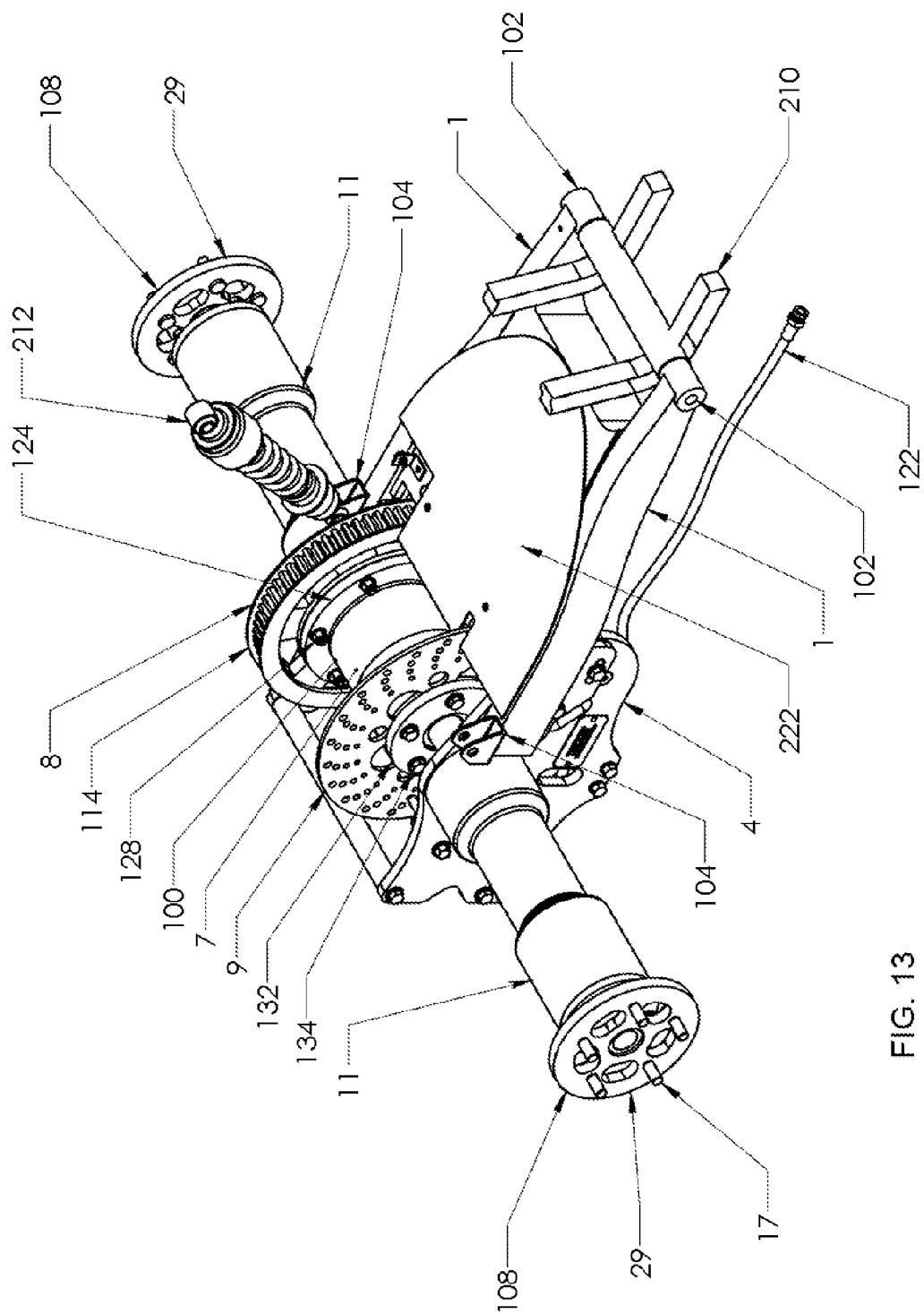
FIG. 13 is a front perspective schematic view of the embodiment of FIG. 3.

Referring now to FIG. 13, this is a front perspective schematic view of the embodiment of FIG. 3. This view illustrates the invention as shown from the brake assembly side and also shows in more detail the attachment points 102 for pivotally attaching the swing arms 1 to the motorcycle frame and the anchors 104 for attaching the shock absorbers to the swing arms 1. In one embodiment, swing arms 1 via attachment points 102 are attached to a motorcycle frame 210, shown schematically in ghost lines. Shock absorbers, such as the representative shock absorber 212 shown schematically in ghost lines, are attached to anchors 104 and to the motorcycle frame 210 at common attachment points, such as proximal to the motorcycle seat. Adjusting holes 3 in overlay plate 2 also are shown in more detail, and provide space for sprocket 8 and disc brake 9 to rotate without contacting safety plate 2.

Figure 14:
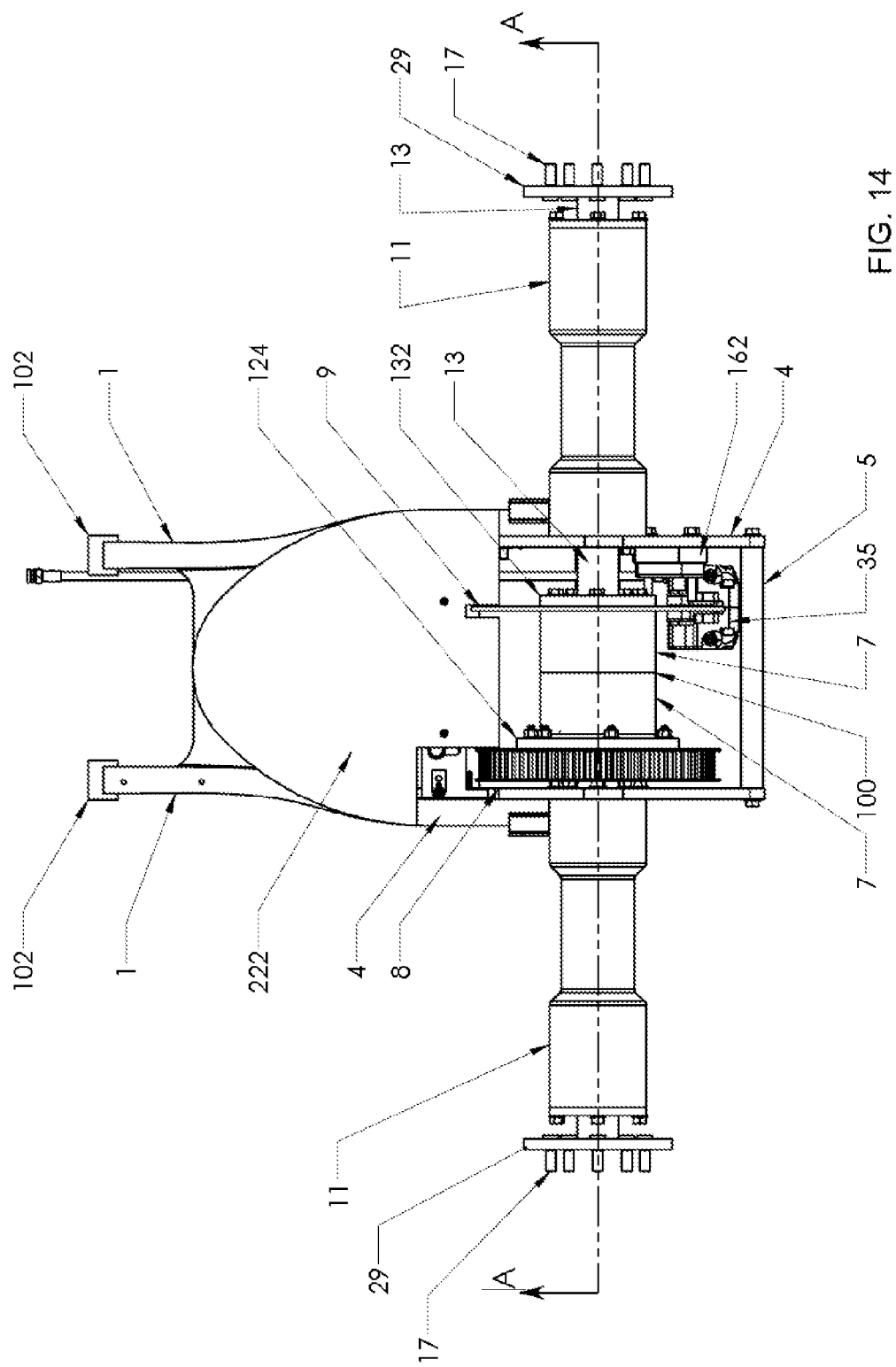
FIG. 14 is a top schematic view of the embodiment of FIG. 3

Referring now to FIG. 14, this is a top schematic view of the embodiment of FIG. 3 illustrating in greater detail the inventive device in an assembled form. In this view, it can be seen that first wheel hub 29, first axle 13, first axle support tube 11, sprocket 8, mounting plate 124, first differential half 7, second differential half, disc brake 9, pressure plate 132, second axle 13, second axle support tube 11, and second wheel hub 29 are all coaxial with one another as mounted on side plates 4 of box or frame 110. In this view, the drive assembly 114 is located to the left side of the interior of the box or frame 110. By using a first axle 13 on the left side of the drive assembly 114 that is longer, and a second axle 13 on the right side of the drive assembly 114 that is shorter, the drive assembly 114 can be located more centrally in, or to the right side of, the interior of the box or frame 110. Thus, the position of the drive assembly 114 can be matched to a specific original motorcycle depending on where the drive chain or drive belt of the original motorcycle is located relative to the box or frame 110.

Figure 15:
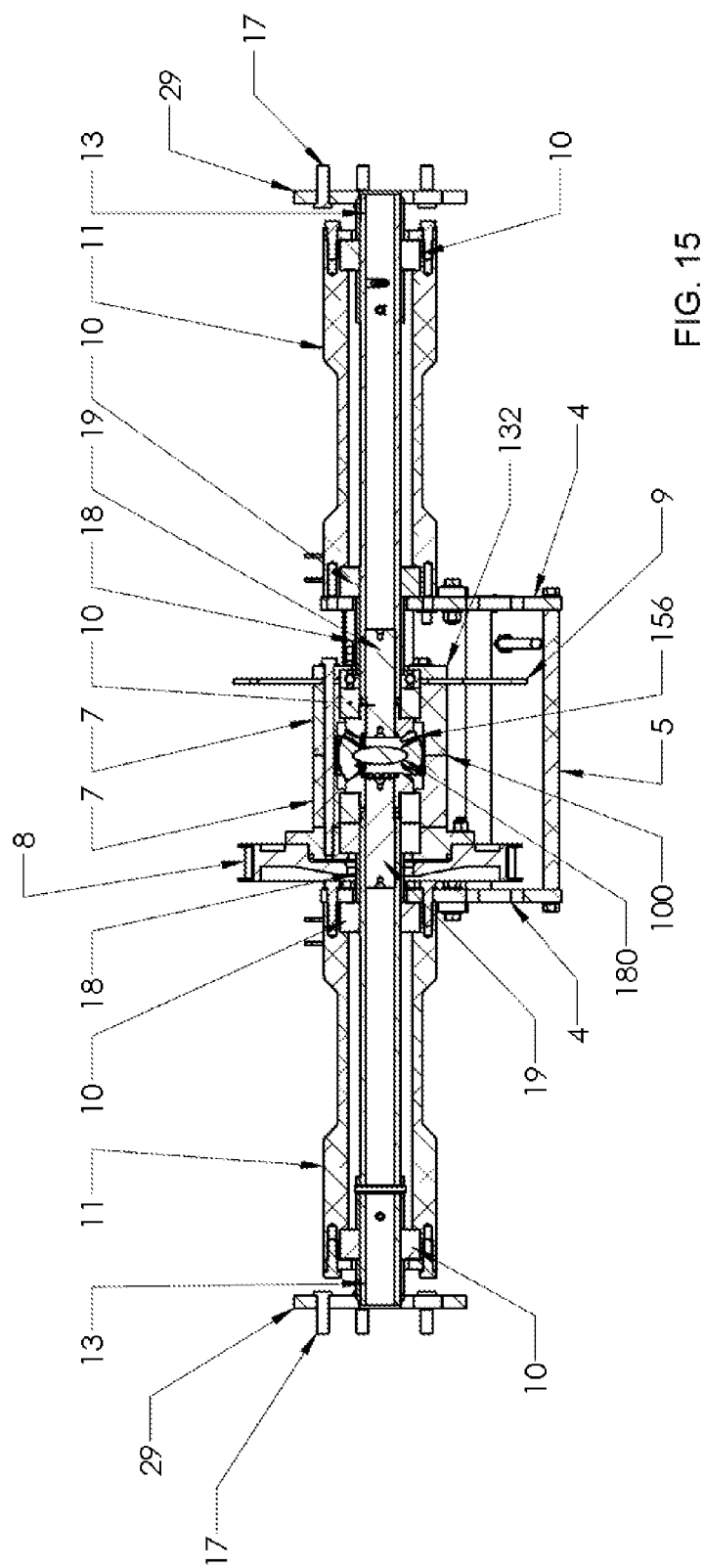
FIG. 15 is a sectional view along line A-A of FIG. 14.

Referring now to FIG. 15, this is a sectional view along line A-A of FIG. 14 also illustrating in greater detail the inventive device in an assembled form. In this view, it can be seen in greater detail that first wheel hub 29, first axle 13, first axle support tube 11, sprocket 8, mounting plate 124, first differential half 7, second differential half, disc brake 9, pressure plate 132, second axle 13, second axle support tube 11, and second wheel hub 29 are all coaxial with one another as mounted on side plates 4 of box or frame 110. In this view, it also can be seen in greater detail how axle stubs 19 connect hollow axles 13 to spyder gears 34. This both allows spyder gears 34 to drive axles 13 and allows axles 13 to support the drive assembly within the box or frame 110.

Figure 16:
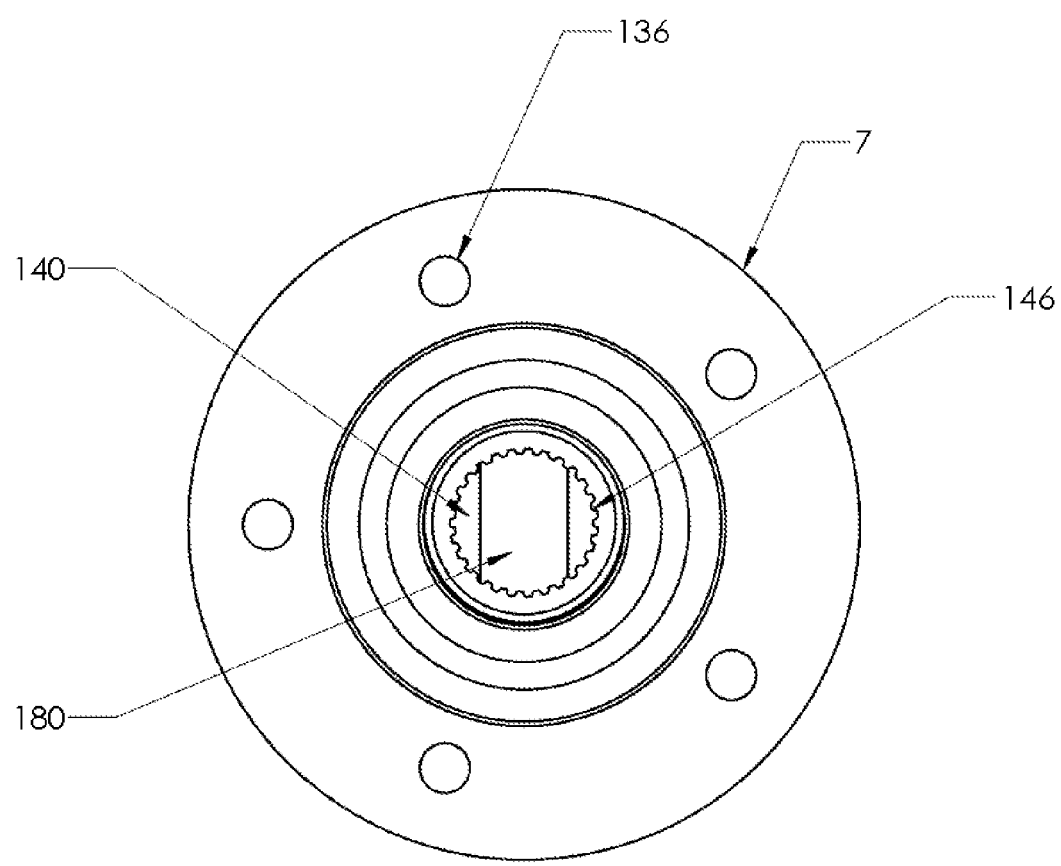
FIG. 16 is an end view of the differential housing of FIG. 3.

Referring now to FIG. 16, this is an end view of the differential assembly 100 of FIG. 3, showing an end of a differential half 7. The interior teeth 146 of a spyder gear 34 can be seen, these interior teeth 146 cooperating with exterior teeth 148 of an axle stub 19 such that the rotation of the spyder gear 34 will turn axle stub 19.

Figure 17:
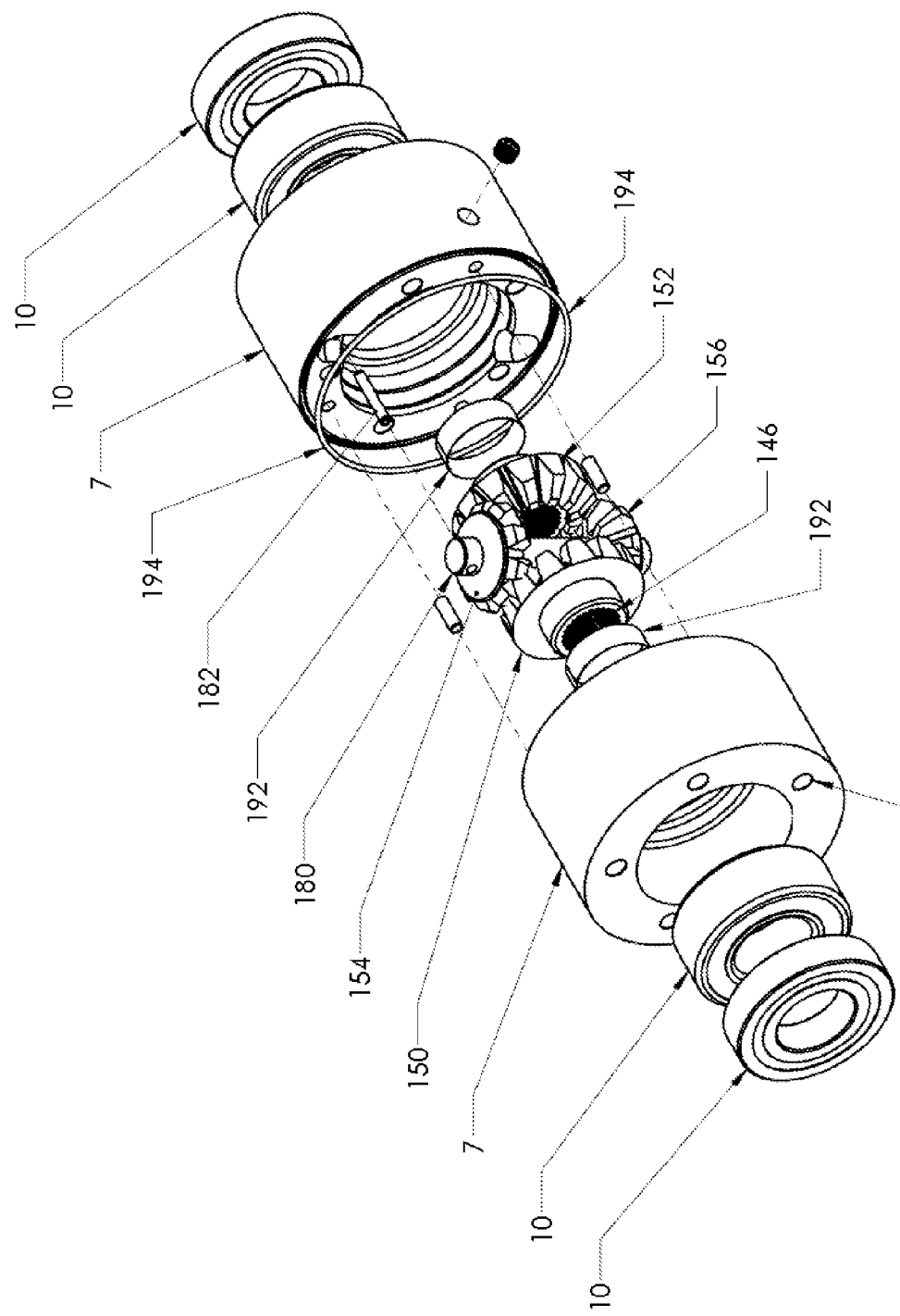
FIG. 17 is an exploded schematic perspective view of a differential and a differential housing of the present invention.

Referring now to FIG. 17, this is an exploded schematic perspective view of a differential and a differential assembly 100 of the present invention. When the differential assembly 100 is assembled, sealers such as O-ring 194 can be used to prevent lubricant from leaking out of the interior of the differential assembly 100 and/or to better retain the respective components on or within the differential assembly. A shim 192, such as a steel shim, can be used to secure the spyder gear 150, 152 to the bearing 10, If necessary or desired. For example, shim 192 can be located between bearing 10 and a central hole through bearing 150, 152 such that spyder gear 150, 152 and bearing are mechanically fastened as a press fit, whereby spyder gear 150, 152 can freely rotate within the differential assembly 100.

Figure 18:
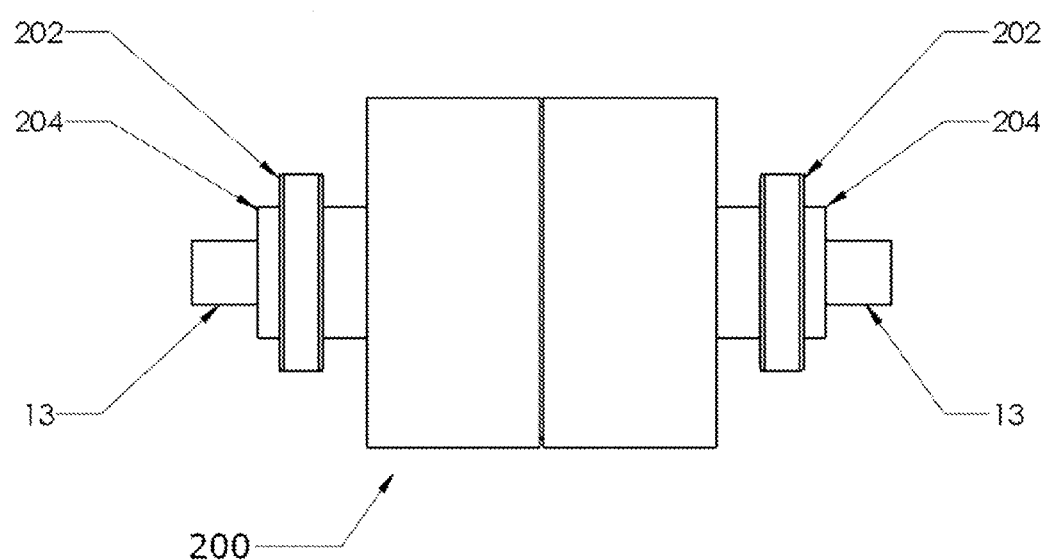
FIG. 18 is a schematic representation of a prior art straddle differential housing.

Referring now to FIG. 18, this is a schematic representation of a straddle differential assembly 200 of the prior art. This prior art straddle differential assembly 200 illustrates a difference between the non-straddle differential assembly 100 of the present invention and the prior art. As disclosed herein, the non-straddle differential assembly 100 comprises a differential that is supported by the axles 13 via the axle stubs 19 connecting the axles 13 to the spyder gears 34, by which the differential assembly 100, and the drive assembly 114, is supported by the axles. No other supports are needed or necessary to support the differential assembly 100 on the inventive device. The prior art differentials are not structured for such support, instead relying on external bearings 202 located on extension tubes 204 extending outwardly from the straddle differential assembly 200. The external bearings 202 are supported by being attached to the automotive frame. Thus, the prior art straddle differential assembly 200 rotates within the external bearings 200. On the contrary, the present non-straddle differential assembly 100 rotates while being supported by the axles 13 and does not need external bearings 202 or external bearing 202 support.

Thus, it can be seen that the present inventive device can be used as a replacement for a conventional rear wheel assembly of a motorcycle for converting the motorcycle into a tricycle with little to no addition modifications of the motorcycle frame 210 or main structural aspects of the original motorcycle. For example, the box or frame 110 can comprise at least two side plates 4 and at least one supporting cross bar 5 connecting the at least two side plates 4 together, whereby the differential assembly 110 is located between the at least two side plates 4, whereby the box or frame 110 is placed between an opening left when a stock rear tire of the two-wheeled motorcycle is removed and replaced with the kit. The kit also can comprise a drive sprocket 8 attached to the differential assembly 100, whereby the differential assembly 100 including the drive sprocket 8 is located between the at least two side plates 4, whereby the box or frame 110 is placed between an opening left when a stock rear tire of the two-wheeled motorcycle is removed and replaced with the kit. The kit can further comprise a brake 9 attached to the differential assembly 100, whereby the differential assembly 100 including the drive sprocket 8 and the brake 9 is located between the at least two side plates 4, whereby the box or frame 110 is placed between an opening left when a stock rear tire of the two-wheeled motorcycle is removed and replaced with the kit.

After the rear wheel assembly of the original motorcycle, which comprises the rear wheel, the rear brake assembly, the drive assembly, and the swing arms, is removed from the original motorcycle, the inventive device can be attached to the original motorcycle via the original attachment points for the original swing arms and to the original shock absorbers and/or suspension, thus converting the original motorcycle to a tricycle. Original hydraulic and electric lines can be attached to the inventive device as needed to operate, for example, the rear brake.

Thus, the invention also includes a method for converting a two-wheeled motorcycle into a three-wheeled motorcycle, comprising:

providing a conversion kit comprising a differential assembly comprising a non-straddle differential, a frame, and an axle assembly comprising an axle, wherein the non-straddle differential is supported by the axle, and wherein the frame comprises at least two side plates and at least one supporting cross bar connecting the at least two side plates together, as disclosed hereinabove;

removing the rear wheel assembly of the two-wheeled motorcycle; and attaching the conversion kit to the two-wheeled motorcycle, whereby the differential assembly is located between the at least two side plates, whereby the frame is placed between an opening left when the rear wheel assembly of the two-wheeled motorcycle is removed and replaced with the kit, as disclosed hereinabove.

The foregoing description of the preferred embodiments and the appended figures have been presented only for illustrative and descriptive purposes and are not intended to be exhaustive or to limit the scope and spirit of the invention. The embodiments were selected and described to best explain the principles of the invention and its practical applications. One of ordinary skill in the art will recognize that many variations can be made to the invention disclosed in this specification without departing from the scope and spirit of the invention.

LIST OF REFERENCE NUMERALS 1 swing arm
2 overlay plate 3 adjusting holes
4 side plates
5 stiffening rods
6 front mounted inner supports
7 differential half or halves
8 sprocket or pulley
9 brake
10 bearing
11 axle support tubes
13 axle
17 wheel studs
18 spacers
19 axle stubs
29 wheel hubs
30 end cap
31 tapered shaft
32 mounting block
33 lock axle nut
34 spyder gears
35 fixed caliper
100 differential assembly
102 attachment points
104 anchors
106 access holes
108 wheel hub assemblies
110 box or frame
112 axle assembly
114 drive assembly
116 sprocket hole
118 disc brake hole
122 hydraulic line
124 mounting plate
126 bolt
128 nut
130 access hole
132 pressure plate
134 bolt
136 hole or tunnel
138 threaded hole
140 access hole
142 access hole
144 access hole
146 interior teeth
148 exterior teeth
150 first sun gear
152 second sun gear
154 first planetary gear
156 second planetary gear
158 bolt
160 nut
162 mounting bracket
164 bolt hole
166 receiving hole
170 bolt
180 shaft
182 pin
192 shim
194 o-ring
200 straddle differential assembly
202 external bearing
204 extension tube
210 motorcycle frame
212 shock absorber
222 safety plate

What is claimed is:

1. A kit for converting a two-wheeled motorcycle into a three-wheeled motorcycle, comprising:

a differential assembly comprising a non-straddle differential within the differential assembly, an access hole through the differential assembly, and a bearing located proximal to or at the access hole, wherein the bearing is constructed and located such that engine output load is distributed across the bearing;

a frame comprising at least two side plates and at least one supporting cross bar connecting the at least two side plates together, whereby the differential assembly is located between the at least two side plates and does not contact either of the at least two side plates;

an axle assembly comprising an axle and an axle support tube, wherein the axle is hollow, wherein the axle passes through the axle support tube and extends through the access hole into the differential assembly, and wherein the axle support tube is attached to the frame and the axle is rotatably supported in the axle support tube by a bearing;

a drive sprocket attached to the differential assembly whereby rotation of the drive sprocket causes the rotation of the differential assembly;

a planetary gear attached to the axle, and a sun gear attached within the differential assembly and operatively connected to the planetary gear, whereby rotation of the differential assembly causes movement of the sun gear, movement of the sun gear causes rotation of the planetary gear, and rotation of the planetary gear causes rotation of the axle; and an axle stub for connecting the axle to the planetary gear, whereby the axle stub fits within the axle and within an access hole in the planetary gear, wherein the non-straddle differential is supported by the axle, and whereby the non-straddle differential runs directly on the axle, and whereby the differential assembly and the frame are placed between an opening left when a stock rear tire of the two-wheeled motorcycle is removed and replaced with the kit.

2. The kit as claimed in claim 1, further comprising a brake attached to the differential assembly, whereby the differential assembly including the drive sprocket and the brake is located between the at least two side plates.

3. The kit as claimed in claim 2, wherein the brake is attached to the differential assembly in such a manner that actuation of the brake acts on the differential assembly.

4. The kit as claimed in claim 1, wherein the axle or the axle stub is replaceable with a component selected from the group consisting of a longer axle, a shorter axle, a longer axle stub, an a shorter axle stub, whereby the differential assembly can be located at different locations between the at least two side plates based on the selected component.

5. The kit as claimed in claim 1, further comprising two axles and two axle support tubes, wherein:

the two axles are hollow;

a first of the two axle support tubes is attached to a first external side of the frame;

a second of the two axle support tubes is attached to a second external side of the frame opposite the first external side of the frame;

the differential assembly is located within the frame between the first axle support tube and the second axle support tube;

a first of the two axles passes through the first of the two axle support tubes and is attached to the non-straddle differential through a first side of the differential assembly;

a second of the two axles passes through the second of the two axle support tubes and is attached to the non-straddle differential through a second side of the differential assembly opposite the first side of the differential assembly, wherein the two axle support tubes and the two axles are all coaxial with each other.

6. The kit as claimed in claim 5, further comprising a brake attached to the differential assembly, whereby the differential assembly including the drive sprocket and the brake is located between the at least two side plates, whereby the frame is placed between the opening left when the stock rear tire of the two-wheeled motorcycle is removed and replaced with the kit.

7. The kit as claimed in claim 6, wherein the brake is attached to the differential assembly in such a manner that actuation of the brake acts on the differential assembly.

8. The kit as claimed in claim 7, further comprising an axle stub for connecting the axle to the planetary gear, whereby the axle stub fits within the axle and within an access hole in the planetary gear.

9. The kit as claimed in claim 8, wherein the axle or the axle stub is replaceable with a component selected from the group consisting of a longer hollow axle, a shorter hollow axle, a longer axle stub, an a shorter axle stub, whereby the differential assembly can be located at different locations between the at least two side plates based on the selected component.

10. A method for converting a two-wheeled motorcycle into a three-wheeled motorcycle, comprising:
   a) providing a conversion kit comprising:
      a differential assembly comprising a non-straddle differential within the differential assembly, an access hole through the differential assembly, and a bearing located proximal to or at the access hole, wherein the bearing is constructed and located such that engine output load is distributed across the bearing;
      a frame comprising at least two side plates and at least one supporting cross bar connecting the at least two side plates together, whereby the differential assembly is located between the at least two side plates and does not contact either of the at least two side plates;
      an axle assembly comprising an axle and an axle support tube, wherein the axle is hollow, wherein the axle passes through the axle support tube and extends through the access hole into the differential assembly, and wherein the axle support tube is attached to the frame and the axle is rotatably supported in the axle support tube by a bearing;
      a drive sprocket attached to the differential assembly whereby rotation of the drive sprocket causes the rotation of the differential assembly;
      a planetary gear attached to the axle, and a sun gear attached within the differential assembly and operatively connected to the planetary gear, whereby rotation of the differential assembly causes movement of the sun gear, movement of the sun gear causes rotation of the planetary gear, and rotation of the planetary gear causes rotation of the axle; and
      an axle stub for connecting the axle to the planetary gear, whereby the axle stub fits within the axle and within an access hole in the planetary gear,
      wherein the non-straddle differential is supported by the axle, and whereby the non-straddle differential runs directly on the axle, and, and
      wherein the frame comprises at least two side plates and at least one supporting cross bar connecting the at least two side plates together;
   b) removing the rear wheel assembly of the two-wheeled motorcycle; and
   c) attaching the conversion kit to the two-wheeled motorcycle, whereby the differential assembly and the frame are located between the at least two side plates, whereby the frame is placed between an opening left when the rear wheel assembly of the two-wheeled motorcycle is removed and replaced with the kit.

11. A kit for converting a two-wheeled motorcycle into a three-wheeled motorcycle, comprising:
   a differential assembly comprising two differential halves and a non-straddle differential within the differential assembly, a respective access hole through each of the two differential halves, and a bearing located proximal to or at each of the access holes, wherein the bearing is constructed and located such that engine output load is distributed across the bearing;
   a frame comprising at least two side plates and at least one supporting cross bar connecting the at least two side plates together, whereby the differential assembly is located between the at least two side plates and does not contact either of the at least two side plates;
   two axle assemblies, each of the two axle assemblies comprising an axle and a respective axle support tube, wherein the axles are hollow, wherein each of the axles passes through a respective axle support tube and extends through a respective access hole into the differential assembly, and wherein the axle support tubes are attached to the frame and the axles are rotatably supported in the respective axle support tube by a bearing;
   a drive sprocket attached to a first of the two differential halves whereby rotation of the drive sprocket causes the rotation of the differential assembly;
   a planetary gear attached to the axles, and a sun gear attached within the differential assembly and operatively connected to the planetary gear, whereby rotation of the differential assembly causes movement of the sun gear, movement of the sun gear causes rotation of the planetary gear, and rotation of the planetary gear causes rotation of the axles; and
   axle stubs for connecting each of the axles to the planetary gear, whereby a respective one of the axle stub fits within a respective one of the axles and within an access hole in the planetary gear,
   wherein the non-straddle differential is supported by the axles, and whereby the non-straddle differential runs directly on the axles, and
   whereby the differential assembly is placed between an opening left when a stock rear tire of the two-wheeled motorcycle is removed and replaced with the kit.

12. The kit as claimed in claim 11, further comprising a brake attached to a second of the two differential halves, whereby actuation of the brake acts on the differential assembly.

13. A kit for converting a two-wheeled motorcycle into a three-wheeled motorcycle, comprising:
   a differential assembly comprising a non-straddle differential within the differential assembly, an access hole through the differential assembly, and a bearing located proximal to or at the access hole;
   a frame comprising at least two side plates and at least one supporting cross bar connecting the at least two side plates together, whereby the differential assembly is located between the at least two side plates and does not contact either of the at least two side plates;
   two axles and two axle support tubes, wherein:
      the two axles are hollow;

a first of the two axle support tubes is attached to a first external side of the frame;

a second of the two axle support tubes is attached to a second external side of the frame opposite the first external side of the frame;

the differential assembly is located within the frame between the first axle support tube and the second axle support tube;

a first of the two axles passes through the first of the two axle support tubes and is attached to the non-straddle differential through a first side of the differential assembly;

a second of the two axles passes through the second of the two axle support tubes and is attached to the non-straddle differential through a second side of the differential assembly opposite the first side of the differential assembly, wherein the two axle support tubes and the two axles are all coaxial with each other;

two axle stubs for connecting the two axles to the planetary gear, whereby each of the axle stubs fits within a respective one of the two axles and within an access hole in the planetary gear;

a drive sprocket attached to the differential assembly whereby rotation of the drive sprocket causes the rotation of the differential assembly;

a brake attached to the differential assembly, whereby the differential assembly including the drive sprocket and the brake is located between the at least two side plates, wherein the brake is attached to the differential assembly in such a manner that actuation of the brake acts on the differential assembly, wherein the non-straddle differential is supported by the two axles, and whereby the non-straddle differential runs directly on the two axles, and whereby the differential assembly and the frame are placed between an opening left when a stock rear tire of the two-wheeled motorcycle is removed and replaced with the kit.

14. The kit as claimed in claim 13, wherein the two axles or the axle stubs are replaceable with a component selected from the group consisting of a longer hollow axle, a shorter hollow axle, a longer axle stub, an a shorter axle stub, whereby the differential assembly can be located at different locations between the at least two side plates based on the selected component.

* * * * *